(12) United States Patent
Lewis et al.

(10) Patent No.: US 9,842,422 B1
(45) Date of Patent: Dec. 12, 2017

(54) METHODS, SYSTEMS, AND MEDIA FOR PRESENTING INTERSTITIAL ANIMATIONS

(71) Applicant: Google Inc., Mountain view, CA (US)

(72) Inventors: Justin Lewis, Marina del Rey, CA (US); Kevin Greene, San Francisco, CA (US)

(73) Assignee: Google Inc., Mountain View, CA (US)

(*) Notice: Subject to any disclaimer, the term of this patent is extended or adjusted under 35 U.S.C. 154(b) by 97 days.

(21) Appl. No.: 14/182,887

(22) Filed: Feb. 18, 2014

(51) Int. Cl.
| | | |
|---|---|---|
| *G06T 13/00* | (2011.01) | |
| *G06T 13/80* | (2011.01) | |
| *G09G 5/34* | (2006.01) | |
| *G09G 5/373* | (2006.01) | |

(52) U.S. Cl.
CPC ............. *G06T 13/80* (2013.01); *G09G 5/34* (2013.01); *G09G 5/373* (2013.01)

(58) Field of Classification Search
CPC .... G09G 5/391; G09G 5/14; G09G 2340/125; G09G 5/395; G06T 3/4007; H04N 21/44004; H04N 21/23406; H04N 19/152
See application file for complete search history.

(56) References Cited

U.S. PATENT DOCUMENTS

| | | | | |
|---|---|---|---|---|
| 6,728,317 B1* | 4/2004 | Demos | ..................... | H04N 5/14 348/E5.108 |
| 2002/0016736 A1* | 2/2002 | Cannon et al. | ................. | 705/14 |
| 2002/0126991 A1* | 9/2002 | Kawamura et al. | ............ | 386/70 |
| 2004/0268400 A1* | 12/2004 | Barde | ................ | H04N 7/17318 725/94 |
| 2006/0206820 A1* | 9/2006 | Bullard | ................... | H04L 69/04 715/733 |
| 2008/0109851 A1* | 5/2008 | Heather et al. | ................. | 725/60 |
| 2009/0259941 A1* | 10/2009 | Kennedy, Jr. | ....... | G06F 17/3079 715/719 |
| 2009/0304072 A1* | 12/2009 | Ikehara | ............ | H04N 21/23406 375/240.02 |
| 2010/0030806 A1* | 2/2010 | Kuhlke | ............. | G06F 17/30781 707/732 |
| 2010/0262911 A1* | 10/2010 | Kaplan et al. | ................. | 715/719 |
| 2011/0202953 A1* | 8/2011 | Johnson et al. | ................. | 725/35 |
| 2012/0064946 A1* | 3/2012 | Voetberg et al. | ............. | 455/566 |
| 2012/0218310 A1* | 8/2012 | Shinohara | ..................... | 345/670 |
| 2013/0290514 A1* | 10/2013 | McGowan et al. | ........... | 709/224 |
| 2015/0100885 A1* | 4/2015 | Riley et al. | .................... | 715/720 |
| 2015/0143413 A1* | 5/2015 | Hall et al. | ....................... | 725/34 |
| 2015/0154660 A1* | 6/2015 | Weald et al. | ............. | 705/14.73 |

FOREIGN PATENT DOCUMENTS

CN 101430781 A * 5/2009

* cited by examiner

*Primary Examiner* — Todd Buttram
(74) *Attorney, Agent, or Firm* — Byrne Poh LLP

(57) ABSTRACT

Methods, systems, and media for presenting interstitial animations are provided. In some embodiments, the method comprises: receiving metadata associated with a video; receiving a request to present the video; causing the video to begin buffering; generating, using a hardware processor, an animation based on the metadata; causing the animation to be presented until a predetermined amount of the video has been buffered; and causing the video to be presented upon buffering the predetermined amount of the video.

15 Claims, 7 Drawing Sheets

METHODS, SYSTEMS, AND MEDIA FOR PRESENTING INTERSTITIAL ANIMATIONS

TECHNICAL FIELD

The disclosed subject matter relates to methods, systems, and media for presenting interstitial animations.

BACKGROUND

Many users enjoy watching streaming media content on their devices. For example, a user can request that a video from a video hosting service be played back on a mobile device. However, for some devices and/or for some types of connections, the time required to load and begin playing an item of media content can be slow. This can lead to frustration for the user. For example, this may cause the user to abort the request when the user cannot determine if the video has encountered an error during the loading process.

Accordingly, it is desirable to provide new methods, systems, and media for presenting interstitial animations.

SUMMARY

Methods, systems, and media for presenting interstitial animations are provided. In accordance with some embodiments of the disclosed subject matter, methods for presenting interstitial animations are provided, the methods comprising: receiving metadata associated with a video; receiving a request to present the video; causing the video to begin buffering; generating, using a hardware processor, an animation based on the metadata; causing the animation to be presented until a predetermined amount of the video has been buffered; and causing the video to be presented upon buffering the predetermined amount of the video.

In accordance with some embodiments of the disclosed subject matter, systems for presenting interstitial animations are provided, the systems comprising: a hardware processor that is configured to: receive metadata associated with a video; receive a request to present the video; cause the video to begin buffering; generate, using a hardware processor, an animation based on the metadata; cause the animation to be presented until a predetermined amount of the video has been buffered; and cause the video to be presented upon buffering the predetermined amount of the video.

In accordance with some embodiments of the disclosed subject matter, non-transitory computer-readable media containing computer executable instructions that, when executed by a processor, cause the processor to perform a method for presenting interstitial animations are provided, the method comprising: receiving metadata associated with a video; receiving a request to present the video; causing the video to begin buffering; generating, using a hardware processor, an animation based on the metadata; causing the animation to be presented until a predetermined amount of the video has been buffered; and causing the video to be presented upon buffering the predetermined amount of the video.

In accordance with some embodiments of the disclosed subject matter, a system for presenting interstitial animations is provided, the system comprising: means for receiving metadata associated with a video; means for receiving a request to present the video; means for causing the video to begin buffering; means for generating an animation based on the metadata; means for causing the animation to be presented until a predetermined amount of the video has been buffered; and means for causing the video to be presented upon buffering the predetermined amount of the video.

In some embodiments, the metadata comprises a title of the video.

In some embodiments, the metadata comprises a thumbnail associated with the video.

In some embodiments, means for generating the animation further comprises: means for identifying one or more pieces of content to be presented by scrolling across a user interface; means for determining a speed at which to scroll the one or more pieces of content; and means for causing the one or more pieces of content to scroll at the determined speed.

In some embodiments, means for generating the animation further comprises: means for identifying one or more pieces of content which should change in size; means for determining a speed at which the pieces of content should change in size; and means for causing the one or more pieces of content to change in size at the determined speed.

In some embodiments, the system further comprises: means for estimating an amount of time until the predetermined amount of video has been buffered; and means for setting a speed of animation at a proportional rate based on the amount of time.

In some embodiments, the system further comprises: means for estimating an amount of time until the predetermined amount of video has been loaded; and means for setting a speed of the animation at a constant rate based on the amount of time.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for presenting interstitial animations are provided.

In accordance with some embodiments, the mechanisms described herein can generate and present animations within a video player during a time that a video is being buffered and before initial presentation of the video. In some such embodiments, the mechanisms described herein can generate the animations based on metadata associated with the video.

In some embodiments, the mechanisms described herein can generate animations, which can include content which scrolls across a user interface, content which grows in size, and/or content which shrinks in size. In some such embodiments, the mechanisms described herein can cause the content to move and/or change in size at a constant rate. Alternatively, in some embodiments, the mechanisms described herein can cause the content to move and/or change in size at a proportional rate. Such a proportional rate can cause a speed at which the animation is presented to decrease as the content approaches a particular position and/or size.

In some embodiments, the mechanisms described herein can generate all of the frames of an animation before the animation is initially presented. Alternatively, in some embodiments, the mechanisms described herein can generate one or more frames of an animation dynamically (e.g., as the animation is being presented).

Figure 1:
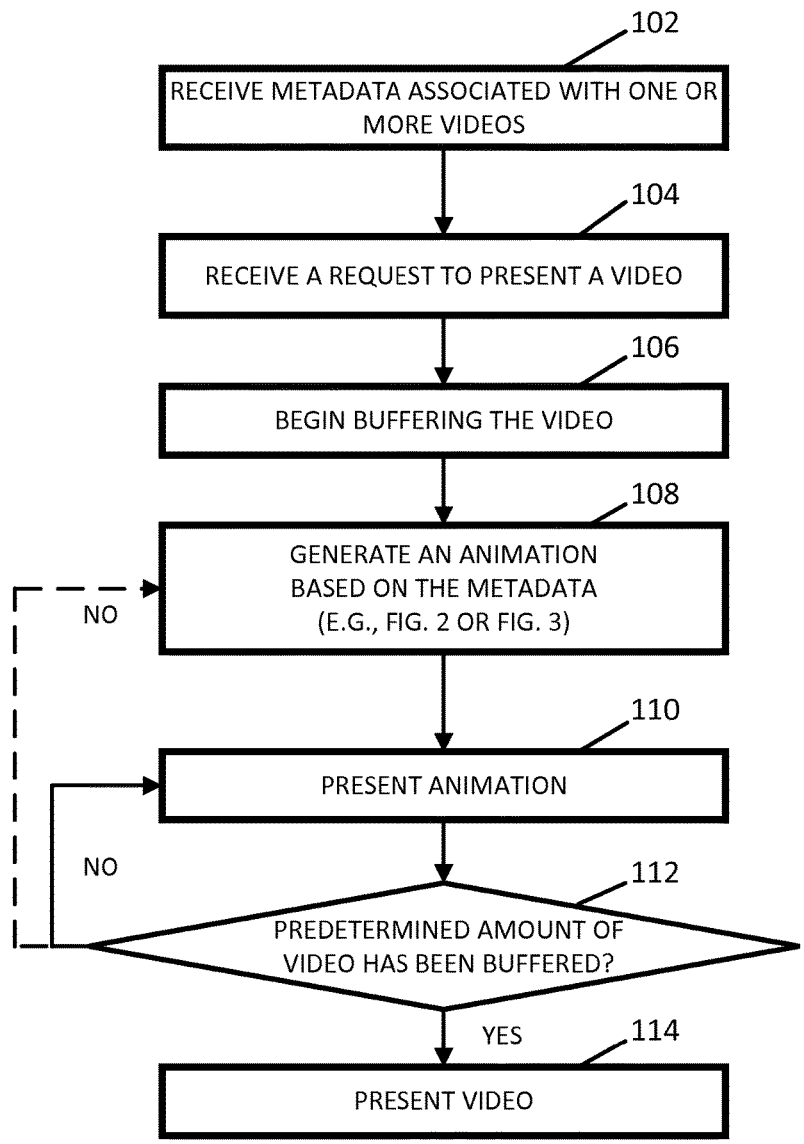
FIG. 1 shows an example of a process for presenting interstitial animations in accordance with some embodiments of the disclosed subject matter.

Turning to FIG. 1, an example 100 of a process for presenting interstitial animations in accordance with some embodiments is shown.

Process 100 can begin by receiving metadata associated with one or more videos at 102. The received metadata can include any suitable information. For example, the received metadata can include a title corresponding to the video. As another example, the received metadata can include a thumbnail image corresponding to the video. Process 100 can additionally or alternatively receive any other suitable metadata, such as the number of views of the video, contacts (e.g., friends and/or acquaintances) of a user who have watched and/or liked the video, and/or any other suitable information. In some embodiments, process 100 can receive metadata from any suitable device, for example, a server that stores and/or transmits media content. Additionally or alternatively, process 100 can receive the metadata using any suitable technique or combination of techniques. For example, metadata corresponding to all of the videos presented as results of a search query can be received.

In instances where information associated with a user's activity on a social network and/or information associated with contacts of the user on a social network are received by process 100, process 100 can obtain consent from the user indicating that such information can be received and/or used. Consent can be obtained in any suitable manner and using any suitable technique. For example, in some embodiments, a dialog box can be presented that asks whether a particular type of information relating to the user or from the user device can be used to generate an interstitial animation.

Process 100 can receive a request to present a video at 104. The request can be generated by any suitable source and/or using any suitable technique or combination of techniques. For example, process 100 can receive a request in response to a user selecting a particular video for presentation. As a more particular example, a user can select a particular video from a list of videos presented in response to a search query as described in connection with FIG. 4. As another more particular example, a user can select a link to a video from a web page and/or an application.

Process 100 can begin buffering the requested video at 106. In some embodiments, process 100 can buffer the video using any suitable technique or combination of techniques. For example, in some embodiments, process 100 can receive the video from a server transmitting media content via a communication network, and process 100 can then cause the received video to be stored in memory on a user device executing process 100 and/or on any other suitable user device. Any suitable amount of buffered video can be stored (e.g., based on memory available to the user device).

Process 100 can generate an animation based on the received metadata at 108. Process 100 can generate the animation using any suitable technique or combination of techniques. For example, in some embodiments, all of the frames for the animation can be generated before the animation is initially presented, for example, as described below in connection with FIG. 2. As another example, in some embodiments, the frames of the animation can be dynamically generated as the animation is presented, as described below in connection with FIG. 3. In some embodiments, a user device that is to present the animation and/or the requested video (e.g., a user device executing process 100) can receive instructions for generating the animation, for example, from a server. In such embodiments, the user device can execute the received instructions to generate and present the animation. Process 100 can determine whether all of the frames of the animation are to be generated before the animation is initially presented or whether the frames are to be dynamically generated using any suitable information, such as a device type associated with the user device executing process 100, a connection speed being used by the user device executing process 100, and/or any other suitable information.

It should be noted that, although the embodiments described herein generally relate to generating an interstitial animation prior to the presentation of video content, this is merely illustrative. Alternatively, an interstitial animation can be generated and presented while a video conference between users is being initiated. In such an embodiment, the metadata received by process 100 can include names of the participants of the video conference, images associated with the participants of the video conference, a name of the service hosting the video conference, and/or any other suitable metadata.

Process 100 can present the animation at 110. Process 100 can present the animation in any suitable manner and/or using any suitable technique or combination of techniques. For example, in some embodiments, process 100 can cause the animation to be presented using the video player window to be used to present the selected video. In some embodiments, process 100 can cause video player controls (e.g., a volume control, a pause control, an input to change the player window size, and/or any other suitable controls) to be presented and/or enabled during presentation of the animation. Additionally or alternatively, in some embodiments, process 100 can cause video player controls to be hidden and/or disabled during presentation of the animation. In some embodiments, any suitable audio can be presented in association with the animation, including no audio.

In some embodiments, where process 100 generates the frames of the animation before the animation is initially presented, the animation can be presented at a constant frame rate, at a frame rate which varies based on an estimate of how much time remains for the predetermined amount of video to be buffered, and/or any suitable combination thereof. In some embodiments, where the frame rate of the animation is varied, process 100 can additionally estimate an amount of time for the predetermined amount of video to finish buffering at 110, and can adjust the frame rate based on the estimated amount of time. As a more particular example, if the current frame rate is 30 frames per second, and process 100 estimates that an additional one second will be required to buffer the predetermined amount of video beyond an initial estimate, process 100 can cause the animation to be presented at a lower frame rate, for example, 20 frames per second. In some embodiments, process 100 can cause a change between two frame rates to be made gradually, for example, by using any suitable acceleration and/or deceleration functions. Process 100 can estimate the amount of time for the predetermined amount of video to finish buffering using any suitable information and using any suitable technique or combination of techniques. For example, in some embodiments, process 100 can estimate the amount of time by comparing a video file size amount (e.g., an amount of video and/or an amount of video corresponding to the predetermined amount of video to be buffered) by a rate at which the video is being transferred (e.g., from a server to a user device). As a more particular example, in some embodiments, process 100 can estimate the amount of time by dividing a number of bits remaining to be buffered by a bitrate of the connection.

Process 100 can determine if a predetermined amount of video has been buffered at 112. The predetermined amount of video can be any suitable amount. For example, in some embodiments, the predetermined amount can be a fixed amount, regardless of any factors such as a type of device presenting the video, the duration of the video, a connection speed of the device to a network, and/or any other factors. As a more particular example, in some embodiments, the predetermined amount can correspond to a fixed amount (e.g., in kilobytes, and/or any other suitable metric) of video stored in memory, for example, in a buffer. As another more particular example, in some embodiments, the predetermined amount can correspond to a fixed duration (e.g., 3 seconds, 5 seconds, 10 seconds, and/or any other suitable duration) of the video and/or of a fixed number (e.g., 10, 20, 50, and/or any other suitable number) of frames of the video. As another example, in some embodiments, process 100 can determine the predetermined amount based on one or more factors. These factors can include, for example: characteristics of a user device executing process 100 (e.g., whether the user device is a mobile phone, whether the user device is a particular type of mobile phone, whether the user device is a tablet computer, whether the user device is using a particular operating system, and/or any other suitable characteristics); a type of data connection (e.g., a WiFi connection, a mobile broadband connection such as LTE, 3G, and/or any other mobile broadband connection, a DSL connection, a dial-up connection, and/or any other type of data connection) being used by the device executing process 100 to buffer the video; the time of day (e.g., morning, evening, and/or any other suitable time); and/or any other suitable factors. As a more particular example, in some embodiments, process 100 can determine the predetermined amount of video to be buffered based on a connection speed of the user device such that the predetermined amount of video to be buffered for higher speed connections is smaller than a predetermined amount of video to be buffered for slower speed connections.

If, at 112, process 100 determines that the predetermined amount of video has not completed buffering ("No" at 112), in some embodiments, process 100 can return to 110 and can continue presenting the animation. Additionally or alternatively, in some embodiments (e.g., in cases where the animation is generated dynamically as it is being presented), process 100 can return to 108 (as shown by the dashed line in FIG. 1) and can continue generating the animation.

If, at 112, process 100 determines that the predetermined amount of video has completed buffering ("Yes" at 112), process 100 can cause the video to be presented at 114. The video can be presented using any suitable technique or combination of techniques. For example, in some embodiments, process 100 can cause the animation to terminate at any suitable point (e.g., an endpoint of the animation, a mid-point of the animation, and/or any other suitable point) and can cause the video to begin being presented with any suitable time between presentation of the animation ending and presentation of the video beginning (including no time). As a more particular example, if the animation contains a block of text which repeatedly scrolls across a user interface, process 100 can cause the video to begin being presented at a point in time when the block of text has fully scrolled off of the user interface. As another example, process 100 can cause the video to be presented using the video player that was used to present the animation.

Figure 2:
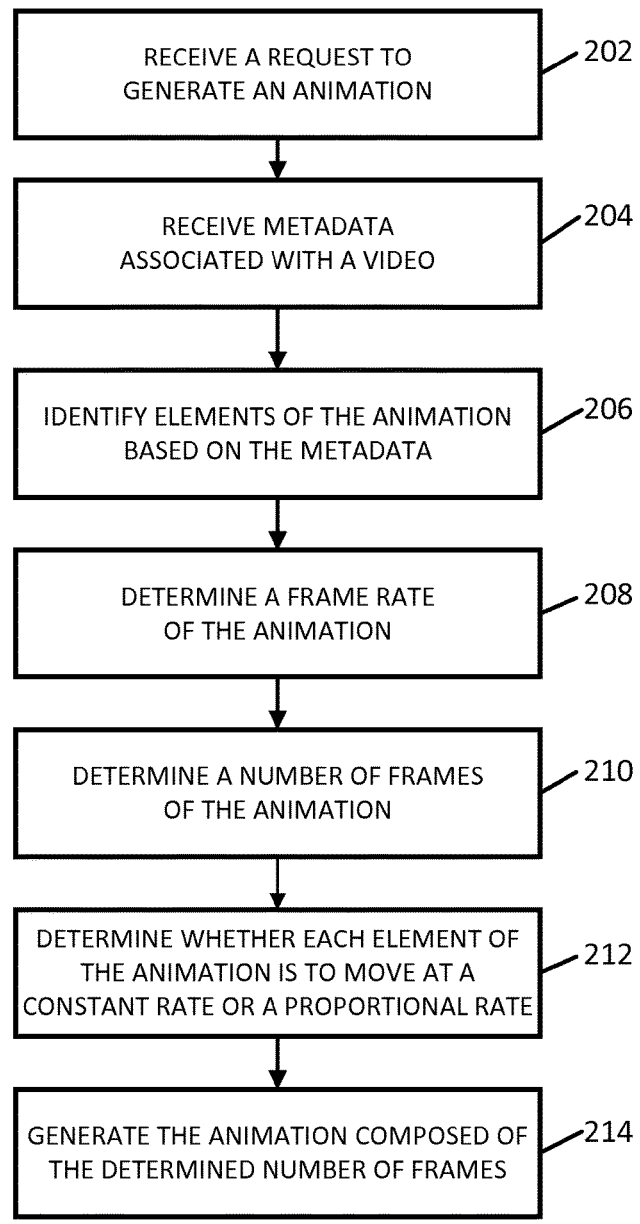
FIG. 2 shows an example of a process for generating frames of an animation based on metadata in accordance with some embodiments of the disclosed subject matter.

Turning to FIG. 2, an example 200 of a process for generating all of the frames of an animation before the animation is initially presented is shown in accordance with some embodiments.

Process 200 can begin by receiving a request to generate an animation at 202. The request can be received from any suitable source, for example, process 100, as described above in connection with FIG. 1.

Process 200 can receive metadata associated with a video at 204. As described above in connection with FIG. 1, the metadata can include any suitable information, such as a title, a thumbnail, a number of views, a name of the creator and/or owner of the video, and/or any other suitable information. The metadata can be received using any suitable technique or combination of techniques. For example, in some embodiments, metadata can be stored in memory on a user device (e.g., when a web page including search results corresponding to a search query is loaded, when an application which provides links to videos is opened, and/or in response to any other event), and the metadata can be received when a hardware processor on the user device accesses the corresponding location in memory.

Process 200 can identify one or more elements to be included in the animation based at least in part on the received metadata at 206. Process 200 can make this determination using any suitable technique or combination of techniques. For example, in some embodiments, each item of metadata (e.g., title of a video, creator of a video, thumbnail image associated with a video, and/or any other suitable type of metadata) can be associated with a graphical element. As a more particular example, a title of a video can be associated with an image which displays the title of the video and any associated icons and/or images. Process 200 can then determine the one or more elements to include in the animation by identifying the graphical elements associated with the metadata. In some embodiments, process 200 can determine that only a subset of the metadata is to be used to create the animation. As a more particular example, process 200 can determine that the animation is to include only a title of the video and a thumbnail image associated with the video, even if other metadata and/or graphical elements exist.

Additionally or alternatively, in some embodiments, process 200 can identify one or more elements to be included in the animation which are based on information other than the metadata. For example, in some embodiments, process 200 can identify one or more elements based on information related to social interactions, for example, on a social network. As a more particular example, in some embodiments, one or more elements of the animation can correspond to a name of a person and/or entity who posted, shared and/or liked the video on a social network. As another particular example, in some embodiments, one or more elements of the animation can correspond to comments related to the video which were posted in association with the video.

Process 200 can determine a frame rate at which the animation is to be presented at 208. Process 200 can make this determination based on any suitable information and using any suitable technique or combination of techniques. For example, in some embodiments, the frame rate can be set to a fixed rate (e.g., 15 frames per second, 30 frames per second, and/or any other suitable frame rate) for all animations. As another example, in some embodiments, the frame rate can be set to different rates depending on one or more factors (e.g., a device type, a speed of a data connection, a frame rate of the video to be loaded, and/or any other suitable factors). In some embodiments, process 200 can access a table and/or a matrix which can associate different frame rates with particular values and/or value ranges of the one or more factors to determine the frame rate.

Process 200 can determine how many frames of the animation to generate at 210. In some embodiments, the frame rate at which the animation is presented can be fixed, for example, as described above in connection with block 110 of process 100. Additionally, in some embodiments, process 200 can determine the number of frames, such that, when presented at a constant frame rate, the animation runs longer than an expected time for the predetermined amount of video to buffer. More particularly, process 200 can determine the number of frames such that the animation will not reach the last frame before the predetermined amount of video has been buffered based on an expected amount of time. As a more particular example, if the fixed frame rate is 30 frames per second, and the expected amount of time required for the predetermined amount of video to be buffered is 5 seconds, process 200 can determine that the number of frames of the animation is to be greater than 150 frames (e.g., 170 frames, 180 frames, 200 frames, and/or any other suitable number of frames).

Alternatively, in some embodiments, the frame rate at which the animation is presented can be varied, for example, as described above in connection with block 110 of process 100. Process 200 can determine how many frames of animation to generate based on information indicating that the frame rate can be varied during animation presentation. For example, process 200 can determine that the number of frames of animation is to be the number of frames corresponding to an average amount of time required to buffer the predetermined amount of video and/or a typical frame rate.

Process 200 can determine if one or more elements of the animation should move and/or scale at a constant rate and/or at a proportional rate at 212. Process 200 can make this determination based on any suitable information, for example, the type of content associated with each element. As a more particular example, if the animation contains a block of text which is to scroll across a user interface, process 200 can determine that the block of text should scroll at a constant rate. As another particular example, if the animation contains an image (e.g., a thumbnail image associated with the video) which is to grow in size until the video has buffered a predetermined amount, process 200 can determine that the image should progress a predetermined amount (e.g., ten percent, twenty percent, fifty percent, and/or any other suitable amount) to the target size for a given time step in the animation (e.g., every second, every ten frames, and/or any other suitable time step metric), and therefore, the image should change in size at a proportional rate.

Process 200 can generate the animation at 214. Process 200 can generate the animation using any suitable technique or combination of techniques. For example, in some embodiments, process 200 can generate an animation composed of the number of frames determined at block 210, such that the frames include the elements (e.g., the elements identified at 206) moved in position, scaled, and/or any other suitable change. As a more particular example, for elements which are moved at a constant rate, process 200 can generate the predetermined number of frames wherein the elements move a fixed amount between successive frames or groups of frames. As another more particular example, for elements to be moved and/or changed in size at a proportional rate, process 200 can generate the predetermined number of frames such that the elements move and/or scale by a fixed percentage toward a target position and/or size across successive frames or groups of frames. In some embodiments, process 200 can apply any suitable video and/or graphics editing techniques to one or more frames of the animation. For example, process 200 can cause any elements of the animation to fade in, fade out, slide in, slide out, and/or any other suitable techniques.

Figure 3:
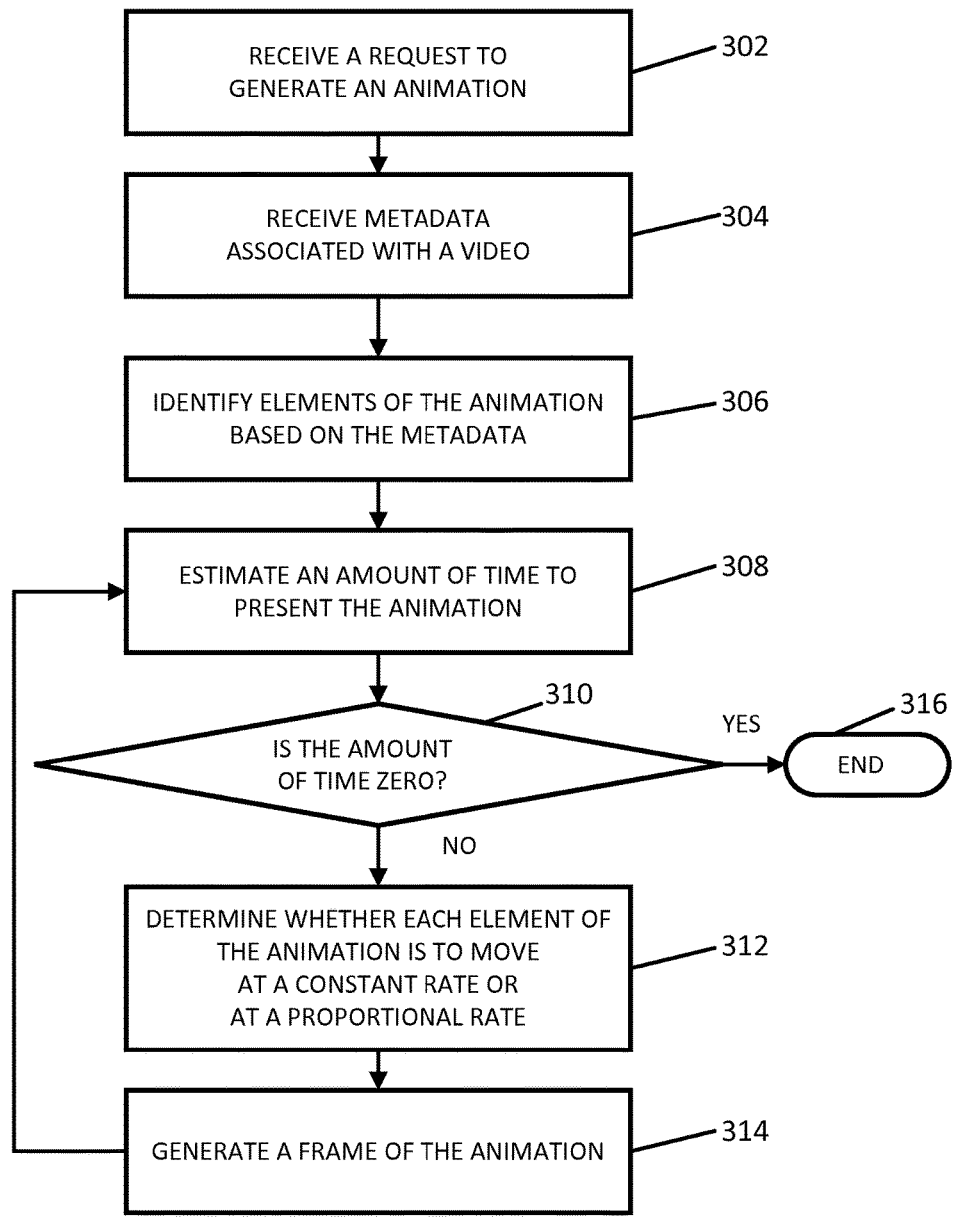
FIG. 3 shows an example of a process for dynamically generating an animation in accordance with some embodiments of the disclosed subject matter.

In some embodiments, the animation can be dynamically generated during presentation of the animation. FIG. 3 shows an example 300 of a process for dynamically generating the animation in accordance with some embodiments.

Process 300 can begin by receiving a request to generate an animation at 302. The request can be received from any suitable source, for example, from process 100 described above in connection with FIG. 1.

Process 300 can receive metadata associated with a video at 304. As described above in connection with FIGS. 1 and 2, the metadata can include any suitable information, such as a title, a thumbnail, a number of views, a name of the creator and/or owner of the video, and/or any other suitable information. The metadata can be received using any suitable technique or combination of techniques, for example, those described above in connection with block 204 of FIG. 2.

Process 300 can identify one or more elements to be included in the animation based on the metadata at 306. Similarly to process 200, process 300 can make this determination using any suitable technique or combination of techniques, such as techniques described above in connection with block 206 of FIG. 2.

Process 300 can estimate an amount of time for which the animation is to be presented at 308. Process 300 can estimate the time based on any suitable information and using any suitable technique or combination of techniques. For example, in some embodiments, process 300 can estimate the amount of time the animation is to be presented based on one or more factors associated with a user device to be used to buffer the video (e.g., the user device executing process 300), such as a device type, an operating system of the device, a speed of a data connection, a location of the device, a connection speed and/or strength of a connection to a network (e.g., the Internet), a time of day, a system associated with the device, and/or any other suitable factors.

Process 300 can determine if the amount of time estimated is zero at 310. If process 300 determines that the animation is to be presented for zero time ("Yes" at 310), process 300 can terminate at 316. The amount of time can be estimated to be zero based on any suitable information. For example, in some embodiments, the amount of time can be estimated to be zero when the amount of video that has been buffered is within a particular range (e.g., one percent, five percent, and/or any other suitable range) of the predetermined amount of video to be buffered.

If process 300 determines that the amount of time estimated is not zero ("No" at 310), process 300 can determine whether each element of the animation is to move at a constant rate and/or at a proportional rate at 312. Similarly to block 212 as described above in connection with FIG. 2, process 300 can make this determination based on any suitable information and using any suitable technique or combination of techniques.

Process 300 can generate one or more frames of animation at 314. In some embodiments, process 300 can generate these one or more frames based at least in part on the frame rate at which the animation is to be presented. For example, if process 300 is generating frames at a particular frame rate, process 300 can generate the one or more frames such that an element (e.g., of the elements identified at block 306) moves and/or is scaled at a predetermined constant or proportional rate. As a more particular example, if process 300 is generating frames to be presented at a rate of 30 frames per second, and a particular block of text is to move at 90 pixels per second, process 300 can generate one or more frames such that the block of text moves 3 pixels relative to the previously generated frame or group of frames. In some embodiments, an amount that an element is to move can be specified with any suitable unit, such as pixels, a percentage of a screen size, and/or any other suitable unit. As another particular example, if process 300 is generating frames to be presented at a rate of 30 frames per second, and a particular image is to progress in size by a predetermined amount (e.g., ten percent, twenty percent, or fifty percent) to a target image size each second, process 300 can generate one or more frames such that the image is enlarged the appropriate amount relative to the previously generated frame or group of frames. In some embodiments, process 300 can use any suitable computer graphics techniques to populate a frame with the one or more elements identified at 306.

Process 300 can then return to 308 and determine a new estimate of time to present the animation. Process 300 can return at any suitable frequency (e.g., 20 times per second, 30 times per second, 40 times per second, and/or any other suitable frequency) and/or after any suitable criterion or criteria are met (e.g., a frame is generated, five frames are generated, a connection speed of the device executing process 300 changes, and/or any other suitable criteria).

Figure 4:
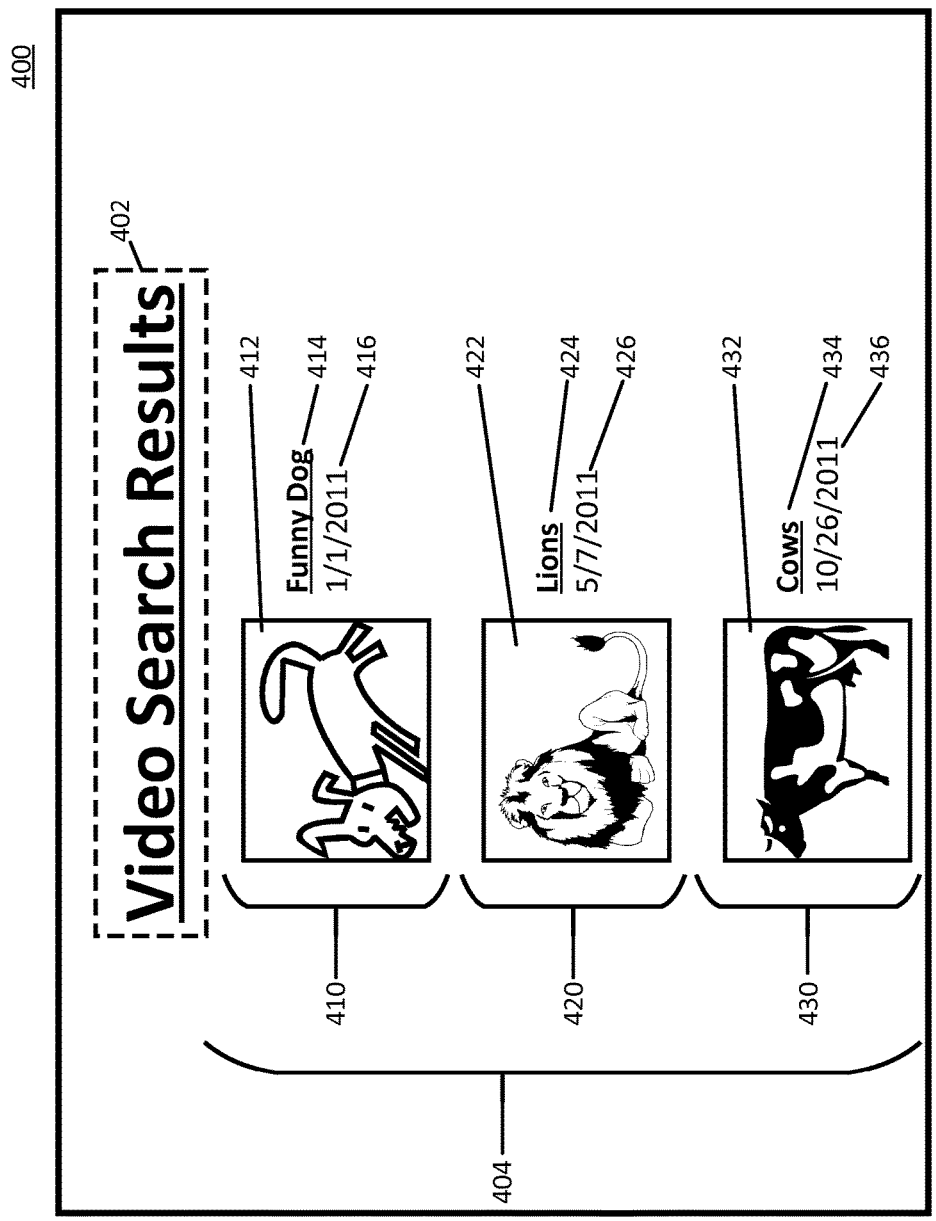
FIG. 4 shows an example of a user interface for presenting video search results that include metadata pertaining to the videos in accordance with some embodiments of the disclosed subject matter.

Turning to FIG. 4, an example 400 of a user interface for presenting video search results wherein each search result is associated with metadata corresponding to the video is shown in accordance with some embodiments. As illustrated, user interface 400 can include a title 402, and one or more search results 404.

In some embodiments, title 402 can indicate content presented in user interface 400. For example, as shown in FIG. 4, title 402 can be a block of text. In some embodiments, title 402 can include any suitable text, images, icons, graphics, animations, and/or any other suitable content. The position of title 402 in user interface 400 is merely an example, and title 402 can be presented in any suitable position. In some embodiments, title 402 can be omitted.

In some embodiments, search results 404 can indicate results presented in response to a search query. For example, as shown in FIG. 4, search results 404 can include video search results 410, 420, and 430. Search results 404 can include any suitable number of results, and the results can be presented in any suitable manner and/or using any suitable technique or combination of techniques. For example, as shown in FIG. 4, search results 404 can be presented such that the results are stacked one on top of the other. As another example, in some embodiments, the search results can be presented horizontally, in a grid, and/or in any other configuration.

In some embodiments, video search results 410, 420, and 430 can be associated with metadata, for example, thumbnails 412, 422, and 432, video titles 414, 424, and 434, and/or dates 416, 426, and 436 can correspond to metadata associated with search results 410, 420, and 430, respectively. Any additional types of metadata can be included with each search result. For example, in some embodiments, the metadata can include identifying information of users other than the user who made the request who have watched and/or liked the video, such as contacts of the user on a social network. As another example, in some embodiments, the metadata can include the name of the creator and/or publisher of the video. As yet another example, in some embodiments, the metadata can include the number of times the video has been viewed. The metadata associated with each search result can be loaded in any suitable manner. For example, in some embodiments, the metadata can be stored in memory on a user device when a web page presenting the search results is first loaded. In some embodiments, only a subset of the metadata can be presented in user interface 400. For example, in some embodiments, metadata such as a number of views associated with a video, and/or any other suitable data can be associated with a search result but may not be presented in user interface 400.

In some embodiments, thumbnails 412, 422, and 432 can be any suitable content corresponding to an associated video. For example, as shown in FIG. 4, thumbnails 412, 422, and/or 432 can be an image associated with the video. In some embodiments, any icons, animations, graphics, text, and/or any other suitable content can be included in thumbnails 412, 422, and/or 432. The positions of thumbnails 412, 422, and 432 in user interface 400 are shown merely as examples and the thumbnails can be presented at any suitable positions. In some embodiments, thumbnails 412, 422, and/or 432 can be omitted.

In some embodiments, video titles 414, 424, and 434 can be any suitable titles corresponding to associated videos. For example, as shown in FIG. 4, video titles 414, 424 and/or 434 can include a text block stating the title of the video. In some embodiments, any suitable information (e.g., creator of the video, place of video creation and/or any other suitable information) can additionally or alternatively be included in video titles 414, 424, and/or 434. The positions of video titles 412, 422, and 432 in user interface 400 are shown merely as examples, and the titles can be presented at any suitable positions. In some embodiments, video titles 412, 422, and/or 432 can be omitted.

In some embodiments, dates 416, 426, and 436 can indicate a date corresponding to an associated video. For example, in some embodiments, dates 416, 426, and/or 436 can indicate the date of creation of the video. As another example, in some embodiments, dates 416, 426, and/or 436 can indicate the date the video was uploaded to the site hosting the video. The positions of dates 416, 426, and 436 in user interface 400 are shown merely as examples and the dates can be presented in any suitable positions. In some embodiments, dates 416, 426, and/or 436 can be omitted.

Figure 5A:
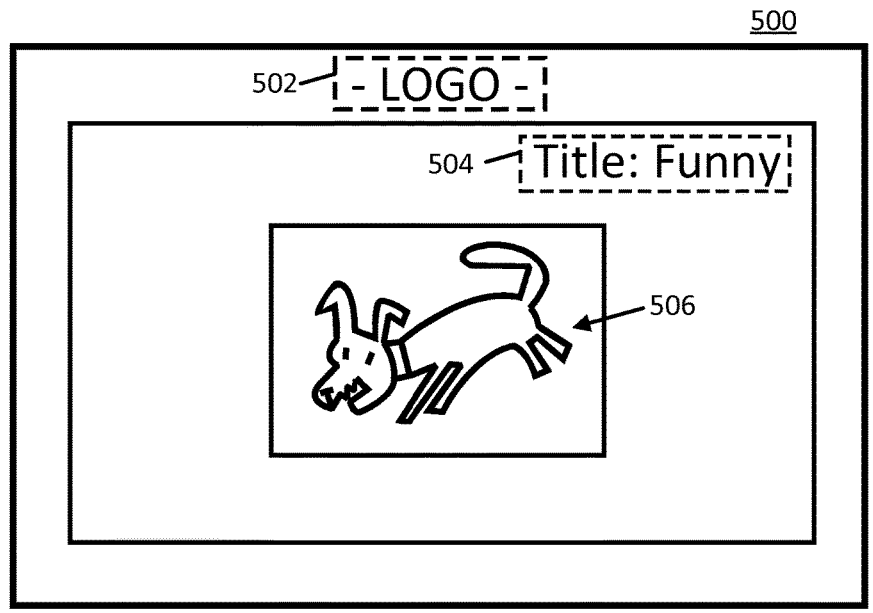
FIGS. 5A-5B show examples of a user interface for presenting interstitial animations in accordance with some embodiments of the disclosed subject matter.
Figure 5B:
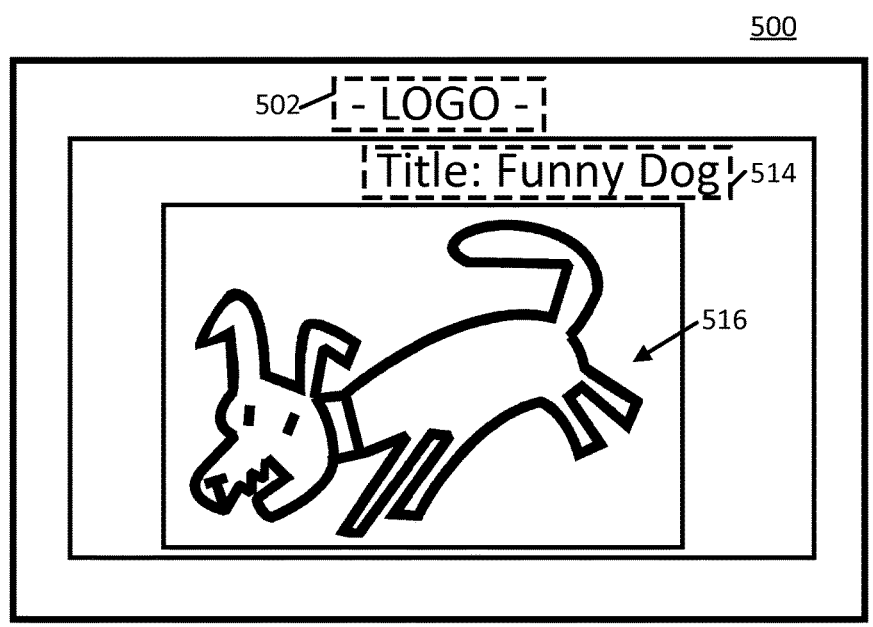

Turning to FIGS. 5A-5B, an example 500 of a user interface for presenting an interstitial animation is shown in accordance with some embodiments. In some embodiments, the interstitial animation can be presented during the period when a selected video is being buffered, for example, as described above in connection with FIGS. 1, 2, and 3. In some embodiments, the interstitial animation can be comprised of elements based on metadata associated with the selected video, such as a title and/or thumbnail associated with the selected video. As illustrated, an interstitial animation presented in user interface 500 can include a logo 502, titles 504 and 514, and thumbnails 506 and 516.

In some embodiments, logo 502 can be any suitable logo corresponding to the provider of user interface 500. As shown in FIGS. 5A and 5B, logo 502 can include a block of text. In some embodiments, any suitable images, icons, graphics, animations, videos, and/or any other suitable content can be included in logo 502. The position of logo 502 in user interface 500 is shown merely as an example, and the logo 502 can be located at any suitable position. In some embodiments, logo 502 can be omitted.

Titles 504 and/or 514 can be any suitable title corresponding to the selected video. As shown in FIGS. 5A and 5B, titles 504 and 514 can be the same title (e.g., the title of the selected video), where a portion of title 504 presented in FIG. 5A is different than a portion of title 514 presented in FIG. 5B, for example, due to movement of the title within user interface 500. Titles 504 and/or 514 can move in any suitable manner. For example, as shown in FIGS. 5A and 5B, titles 504 and 514 can scroll across user interface 500. In some embodiments, titles 504 and 514 can scroll across user interface 500 in any suitable direction (e.g., horizontally, vertically, diagonally, and/or any other suitable direction). As another example, in some embodiments, titles 504 and 514 can blink on and off. As yet another example, in some embodiments, titles 504 and 514 can move in a random or pseudo-random pattern across user interface 500. Additionally or alternatively, in some embodiments, text, such as titles 504 and 514 can be scaled. In some embodiments, titles 504 and/or 514 can be omitted.

Thumbnails 506 and/or 516 can be any suitable image or images corresponding to the selected video. As shown in FIGS. 5A and 5B, thumbnails 506 and 516 can be the same thumbnail (e.g., a thumbnail associated with the selected video), where thumbnail 516 is scaled to a different size in FIG. 5B relative to thumbnail 506 in FIG. 5A. Thumbnails 506 and/or 516 can move and/or scale in any suitable manner. For example, as shown in FIGS. 5A and 5B, thumbnails 506 and/or 516 can grow in size, such that the thumbnail fills the entire player window just before the selected video begins playing. In some embodiments, thumbnails 506 and/or 516 can grow at a proportional rate, such that the thumbnail image reaches a predetermined amount (e.g., ten percent, twenty percent, fifty percent, and/or any other size) to a target size (for example, the size of the video player window) within a set time step (e.g., every half second, every second, and/or any other suitable time step). As another example, thumbnail 506 and/or 516 can shrink in size such that the thumbnail appears to disappear or reach any other suitable size (e.g., ten percent of the window, five percent of the window, and/or any other suitable size) at the moment the predetermined amount of video is loaded and/or just prior to a time when presentation of the video begins. As yet another example, in some embodiments, a portion of thumbnails 506 and/or 516 can be selected for presentation by zooming in and/or zooming out on the thumbnail image at any suitable constant and/or proportional rate. As still another example, thumbnails 506 and/or 516 can move in any suitable manner within user interface 500 (e.g., scroll horizontally, scroll vertically, move in a random pattern, and/or any other suitable movement).

Figure 6:
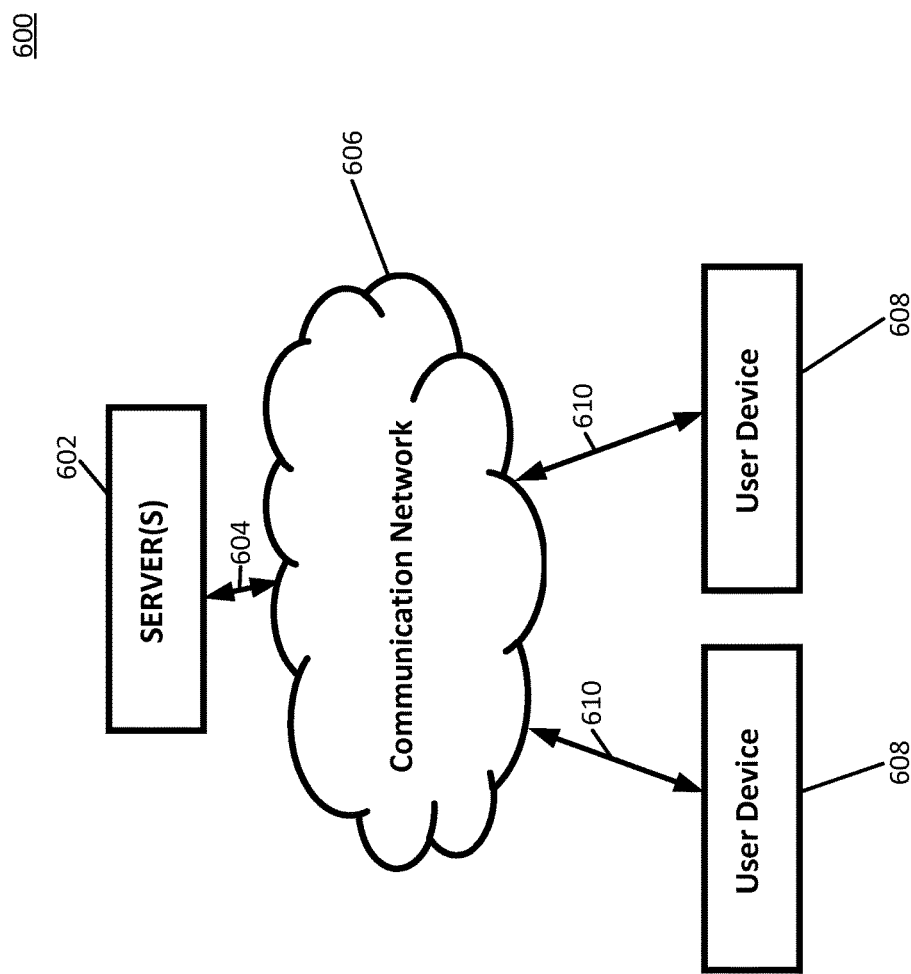
FIG. 6 shows a schematic diagram of an illustrative system suitable for implementation of mechanisms described herein for presenting interstitial animations in accordance with some embodiments of the disclosed subject matter.

FIG. 6 shows an example 600 of a generalized schematic diagram of an illustrative system on which the mechanisms for presenting interstitial animations can be implemented in accordance with some embodiments of the disclosed subject matter. As illustrated, system 600 can include one or more user devices 608. User devices 608 can be local to each other or remote from each other. User devices 608 can be connected by one or more communication links 610 to a communications network 606 that can be linked via a communications link 604 to a server 602.

System 600 can include one or more servers 602. Server(s) 602 can be any suitable server(s) for providing access to the mechanisms described herein for presenting interstitial animations, such as a processor, a computer, a data processing device, or any suitable combination of such devices. For example, the mechanisms for presenting interstitial animations can be distributed into multiple backend components and multiple frontend components and/or interfaces. In a more particular example, backend components, such as responding to a request to present a video and/or delivering a video and associated metadata can be performed on one or more servers 602.

In some embodiments, each of the user devices 608 and server 602 can be any of a general purpose device such as a computer or a special purpose device such as a client, a server, and/or any other suitable device. Any of these general or special purpose devices can include any suitable components such as a hardware processor (which can be a microprocessor, digital signal processor, a controller, and/or any other type of hardware processor), memory, communication interfaces, display controllers, input devices, and/or any other suitable components. For example, user device 608 can be implemented as a smartphone, a tablet computer, a wearable computer, a personal computer, a laptop computer, a digital media receiver, a personal data assistant (PDA), a set-top box, a smart television, a home entertainment system, a game console, any other suitable user device, or any suitable combination thereof.

Communications network 606 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable type of network. Communications links 604 and 610 can be any communications links suitable for communicating data among user devices 608 and server 602, such as network links, dial-up links, wireless links, hard-wired links, any other suitable communications links, or any suitable combination of such links. User devices 608 can enable use of the techniques described herein that can allow the features of the mechanisms to be used. User devices 608 and server 602 can be located at any suitable location.

Figure 7:
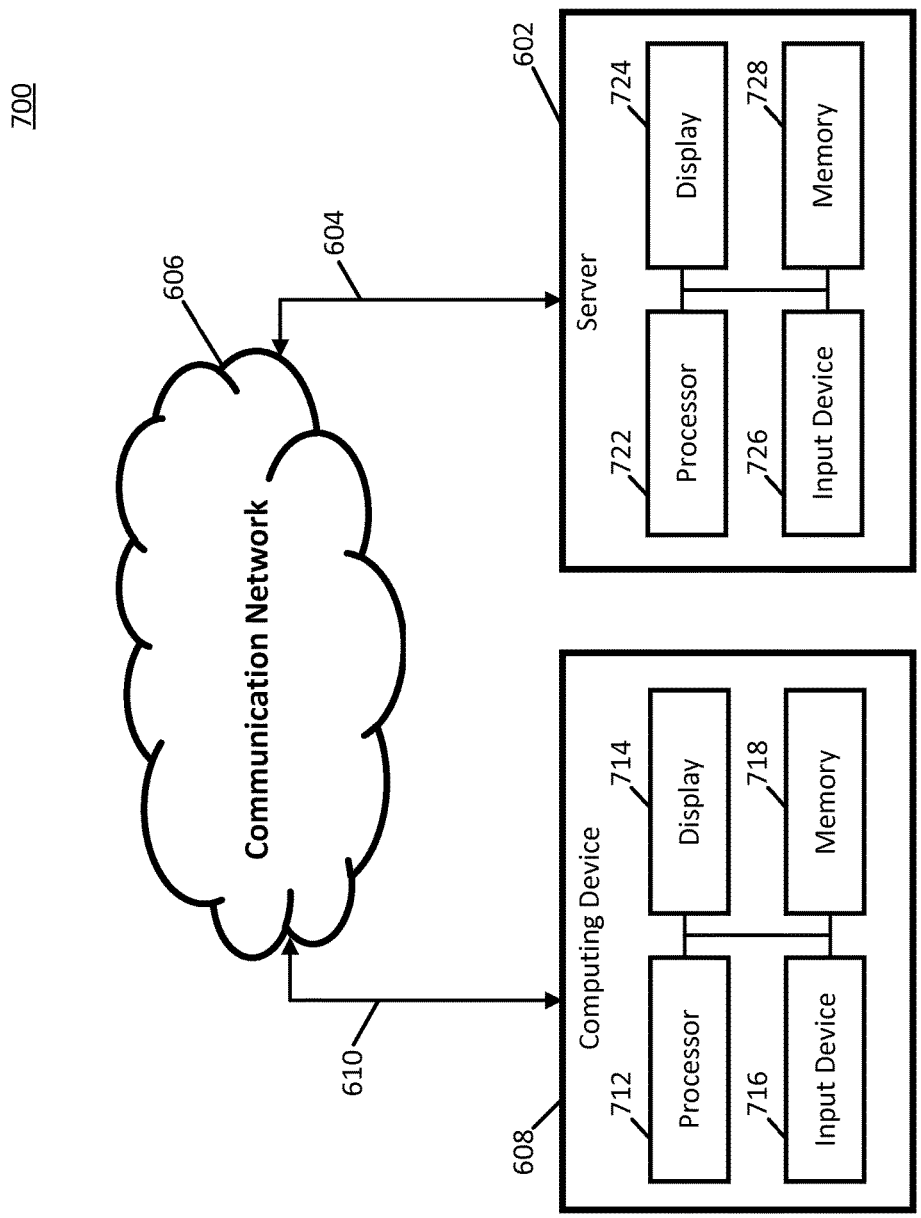
FIG. 7 shows an example of a server and a user device of FIG. 6 that can be used in accordance with some embodiments of the disclosed subject matter.

FIG. 7 illustrates an example 700 of hardware that can be used to implement server 602 and one of user devices 608 depicted in FIG. 6 in accordance with some embodiments. Referring to FIG. 7, user device 608 can include a hardware processor 712, a display 714, an input device 716, and memory 718, which can be interconnected. In some embodiments, memory 718 can include a storage device (such as a non-transitory computer-readable medium) for storing a computer program for controlling hardware processor 712.

Hardware processor 712 can use the computer program to present on display 714 content and/or an interface that allows a user to interact with the mechanisms described herein for presenting interstitial animations and to send and receive data through communications link 610. For example, hardware processor 712 can be programmed to perform any of processes 100, 200, and/or 300. As a more particular example, hardware processor 712 can be programmed to determine how many frames of an animation are to be generated. As another more particular example, hardware processor 712 can be programmed to generate an animation such that elements of the animation move and/or scale at a constant and/or proportional rate. It should also be noted that data received through communications link 610 or any other communications links can be received from any suitable source. In some embodiments, hardware processor 712 can send and receive data through communications link 608 or any other communication links using, for example, a transmitter, a receiver, a transmitter/receiver, a transceiver, or any other suitable communication device. Input device 716 can be a computer keyboard, a mouse, a touchscreen, a microphone, and/or any other suitable input device. Display 714 can be a touchscreen, a flat-panel display, a cathode ray tube display, a projector, a speaker or speakers, and/or any other suitable display and/or presentation devices on which videos and/or animations can be presented.

Server 602 can include a hardware processor 722, a display 724, an input device 726, and memory 728, which can be interconnected. In some embodiments, memory 728 can include a storage device for storing data received through communications link 604 or through other links, and can also receive commands and values transmitted by one or more users. The storage device can further include a server program for controlling hardware processor 722. For example, the server program can specify one or more techniques by which videos, metadata, search results, and/or any other suitable information are to be determined and/or presented.

The mechanisms described herein for presenting interstitial animations can be implemented in user devices 608 as software, firmware, hardware, or any suitable combination thereof.

In some embodiments, server 602 can be implemented in one server or can be distributed as any suitable number of servers. For example, multiple servers 602 can be implemented in various locations to increase reliability and/or increase the speed at which the server can communicate with user devices 608.

It should be understood that at least some of the above described blocks of the processes of FIGS. 1, 2, and 3 can be executed or performed in any order or sequence not limited to the order and sequence shown in and described in the figures. Also, some of the above blocks of FIGS. 1, 2, and 3 can be executed or performed substantially simultaneously where appropriate or in parallel to reduce latency and processing times. Additionally or alternatively, some of the above described blocks of processes of FIGS. 1, 2, and 3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting interstitial animations are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting an interstitial animation, comprising:
   receiving, at a user device, metadata associated with a video;
   storing the metadata associated with the video in the user device;
   receiving, from the user device, a request to present the video;
   causing the video to begin buffering;
   determining an expected duration of time required for a predetermined amount of the video to be buffered based at least on information related to the user device;
   determining animation parameters for generating an animation that include at least a minimum number of frames of the animation and a frame rate of the animation based at least in part on the expected duration of time required for a predetermined amount of the video to be buffered such that the animation having the minimum number of frames rendered at the frame rate has a duration that exceeds the expected duration of time required for the predetermined amount of the video to be buffered;
   identifying one or more elements indicated by the metadata that is stored in the user device, wherein the one or more elements correspond to at least a title of the video and a thumbnail image associated with the video;

generating, using a hardware processor, the animation in accordance with the determined animation parameters by generating at least the minimum number of frames of the animation that each includes at least the identified elements, wherein a position of the identified elements is different across each of the frames;

causing the animation to be presented until the predetermined amount of the video has been buffered; and causing the video to be presented upon buffering the predetermined amount of the video.

2. The method of claim 1, wherein generating the animation further comprises:

identifying one or more pieces of content to be presented by scrolling across a user interface;

determining a speed at which to scroll the one or more pieces of content; and causing the one or more pieces of content to scroll at the determined speed.

3. The method of claim 1, wherein generating the animation further comprises:

identifying one or more pieces of content which should change in size;

determining a speed at which the pieces of content should change in size; and causing the one or more pieces of content to change in size at the determined speed.

4. The method of claim 1, further comprising:

setting a speed of the animation at a proportional rate based on the expected duration of time required for the predetermined amount of the video to be buffered.

5. The method of claim 1, further comprising:

setting a speed of the animation at a constant rate based on the expected duration of time required for the predetermined amount of the video to be buffered.

6. A system for presenting interstitial animations, the system comprising:

a hardware processor that is configured to:

receive, at a user device, metadata associated with a video;

store the metadata associated with the video in the user device;

receive, from the user device, a request to present the video;

cause the video to begin buffering;

determine an expected duration of time required for a predetermined amount of the video to be buffered based at least on information related to the user device;

determine animation parameters for generating an animation that include at least a minimum number of frames of the animation and a frame rate of the animation based at least in part on the expected duration of time required for a predetermined amount of the video to be buffered such that the animation having the minimum number of frames rendered at the frame rate has a duration that exceeds the expected duration of time required for the predetermined amount of the video to be buffered;

identify one or more elements indicated by the metadata that is stored in the user device, wherein the one or more elements correspond to at least a title of the video and a thumbnail image associated with the video;

generate the animation in accordance with the determined animation parameters by generating at least the minimum number of frames of the animation that each includes at least the identified elements, wherein a position of the identified elements is different across each of the frames;

cause the animation to be presented until the predetermined amount of the video has been buffered; and cause the video to be presented upon buffering the predetermined amount of the video.

7. The system of claim 6, wherein the hardware processor is further configured to:

identify one or more pieces of content to be presented by scrolling across a user interface;

determine a speed at which to scroll the one or more pieces of content; and cause the one or more pieces of content to scroll at the determined speed.

8. The system of claim 6, wherein the hardware processor is further configured to:

identify one or more pieces of content which should change in size;

determine a speed at which the pieces of content should change in size; and cause the one or more pieces of content to change in size at the determined speed.

9. The system of claim 6, wherein the hardware processor is further configured to:

set a speed of the animation at a proportional rate based on the expected duration of time required for the predetermined amount of the video to be buffered.

10. The system of claim 6, wherein the hardware processor is further configured to:

set a speed of the animation at a constant rate based on the expected duration of time required for the predetermined amount of the video to be buffered.

11. A non-transitory computer-readable medium containing computer executable instructions that, when executed by a processor, cause the processor to perform a method for presenting interstitial animations, the method comprising:

receiving, at a user device, metadata associated with a video;

storing the metadata associated with the video in the user device;

receiving, from the user device, a request to present the video;

causing the video to begin buffering;

determining an expected duration of time required for a predetermined amount of the video to be buffered based at least on information related to the user device;

determining animation parameters for generating an animation that include at least a minimum number of frames of the animation and a frame rate of the animation based at least in part on the expected duration of time required for a predetermined amount of the video to be buffered such that the animation having the minimum number of frames rendered at the frame rate has a duration that exceeds the expected duration of time required for the predetermined amount of the video to be buffered;

identifying one or more elements indicated by the metadata that is stored in the user device, wherein the one or more elements correspond to at least a title of the video and a thumbnail image associated with the video;

generating the animation in accordance with the determined animation parameters by generating at least the minimum number of frames of the animation that each includes at least the identified elements, wherein a position of the identified elements is different across each of the frames;

causing the animation to be presented until the predetermined amount of the video has been buffered; and causing the video to be presented upon buffering the predetermined amount of the video.

12. The non-transitory computer-readable medium of claim 11, wherein generating the animation further comprises:

identifying one or more pieces of content to be presented by scrolling across a user interface;

determining a speed at which to scroll the one or more pieces of content; and causing the one or more pieces of content to scroll at the determined speed.

13. The non-transitory computer-readable medium of claim 11, wherein generating the animation further comprises:

identifying one or more pieces of content which should change in size;

determining a speed at which the pieces of content should change in size; and causing the one or more pieces of content to change in size at the determined speed.

14. The non-transitory computer-readable medium of claim 11, wherein the method further comprises:

setting a speed of the animation at a proportional rate based on the expected duration of time required for the predetermined amount of the video to be buffered.

15. The non-transitory computer-readable medium of claim 11, wherein the method further comprises:

setting a speed of the animation at a constant rate based on the expected duration of time required for the predetermined amount of the video to be buffered.

* * * * *